(12) United States Patent
Jones et al.

(10) Patent No.: US 6,772,243 B2
(45) Date of Patent: Aug. 3, 2004

(54) APPARATUS AND METHOD FOR GENERATING A PARTIAL FULLNESS INDICATOR SIGNAL IN A FIFO

(75) Inventors: Ian W. Jones, Palo Alto, CA (US); Josephus C. Ebergen, San Francisco, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 451 days.

(21) Appl. No.: 09/742,162

(22) Filed: Dec. 19, 2000

(65) Prior Publication Data

US 2002/0116556 A1 Aug. 22, 2002

(51) Int. Cl.$^7$ .............................. G06F 3/00; G06F 3/06; G06F 5/00
(52) U.S. Cl. ............................. 710/57; 710/52; 710/56; 711/170; 709/234
(58) Field of Search .............................. 710/33, 52, 53, 710/56, 57, 61, 36

(56) References Cited

U.S. PATENT DOCUMENTS

| | | | | |
|---|---|---|---|---|
| 5,117,395 A | * | 5/1992 | Hashimoto | 365/221 |
| 5,390,299 A | * | 2/1995 | Rege et al. | 709/234 |
| 5,457,688 A | * | 10/1995 | Andersen | 370/449 |
| 5,513,224 A | * | 4/1996 | Holt | 375/372 |
| 5,838,933 A | | 11/1998 | Molnar et al. | |
| 5,920,899 A | | 7/1999 | Chu | |
| 6,055,588 A | * | 4/2000 | Steinmetz et al. | 710/52 |
| 6,097,655 A | * | 8/2000 | Kessler | 365/221 |
| 6,115,760 A | | 9/2000 | Lo et al. | |
| 6,279,077 B1 | * | 8/2001 | Nasserbakht et al. | 711/118 |
| 6,356,117 B1 | * | 3/2002 | Sutherland et al. | 326/93 |
| 6,389,490 B1 | * | 5/2002 | Camilleri et al. | 710/57 |
| 6,401,148 B1 | * | 6/2002 | Camilleri | 710/57 |
| 6,405,269 B1 | * | 6/2002 | Camilleri et al. | 710/57 |
| 6,434,642 B1 | * | 8/2002 | Camilleri et al. | 710/57 |

FOREIGN PATENT DOCUMENTS

| | | | | |
|---|---|---|---|---|
| JP | 05266202 A | * | 10/1993 | G06F/15/72 |
| JP | 06119772 A | * | 4/1994 | G11C/7/00 |
| JP | 10229399 A | * | 8/1998 | H04L/12/28 |

OTHER PUBLICATIONS

Brunvand, E; "Low latency self–timed flow–through FIFOs", Advanced Research in VLSI, 1995. IEEE, 16th conference on Mar. 27–29, 1995. Pp. 76–90.*

Rothauser et al., "Jitter Reduction Technique Without Timing Extraction" *IBM Technical Bulletin*, IBM Corporation, New York, vol. 12, No. 11 (Apr. 1970) pp. 2036–2037.

* cited by examiner

*Primary Examiner*—Jeffrey Gaffin
*Assistant Examiner*—Angel L. Casiano
(74) *Attorney, Agent, or Firm*—Townsend and Townsend and Crew LLP (57) ABSTRACT

Techniques for indicating partial fullness levels of a FIFO comprising a plurality of stages using a partial fullness detector, such as a m-out-of-n detector. According to an embodiment, the m-out-of-n detector is coupled to "n" stages of the FIFO and configured to output a partial fullness indicator signal based on the full/empty states of the stages coupled to the m-out-of-n detector. The m-out-of-n detector may be configured to output the partial fullness indicator signal in a first state when "m" stages coupled to the m-out-of-n detector are full, and to output the partial fullness indicator signal in a second state when "m" stages coupled to the m-out-of-n detector are empty. The number of full stages of the FIFO lies in a first range when the m-out-of-n detector outputs the signal in the first state, and in a second range when the m-out-of-n detector outputs the signal in the second state. The bounds for the ranges may be determined based on factors such as the input and output rate characteristics of the FIFO. The m-out-of-n detector may be used to indicate partial fullness levels for various FIFOs including linear flow-through FIFOs, serial-concurrent-serial (SCS) FIFOs, and the like.

46 Claims, 6 Drawing Sheets

APPARATUS AND METHOD FOR GENERATING A PARTIAL FULLNESS INDICATOR SIGNAL IN A FIFO

BACKGROUND OF THE INVENTION

The present invention relates to first-in-first-out (FIFO) data pipelines, and more particularly to techniques for monitoring and indicating partial fullness levels of the FIFO pipelines.

FIFOs are widely used in computer and telecommunication fields for buffering data and handling transfer of data items between producers which deliver data items to the FIFO and consumers which remove data items from the FIFO. FIFOs are typically used as buffers for transferring data items between systems which may be clocked or asynchronous. For clocked systems involved in the transfer of the data items, the clocks may be of different frequencies and/or phases. Such buffers are typically used in systems where data items are produced or consumed in bursts.

FIFO implementations are usually either RAM-based or flow-through designs. The present invention relates to flow-through FIFOs. A flow-through FIFO generally comprises a plurality of stages and has an input port and an output port. Data items enter the FIFO at the input port, progress from one stage of the FIFO to the next, and exit the FIFO at the output port after the last stage of the FIFO. Accordingly, as suggested by the name FIFO (first-in-first-out), the order in which data items exit a FIFO is the same as the order in which the data items entered the FIFO.

When using a FIFO, it is often useful to know the fullness level of a FIFO. For example, a producer of data items needs to know if a FIFO is "almost full" in order to stop sending data items to the FIFO before the FIFO overflows. Similarly, a consumer needs to know when the FIFO is "almost empty" so that the consumer can slow down or stop trying to remove data items from the FIFO. Accordingly, a FIFO generally has signals associated with it which monitor and indicate the fullness level of the FIFO. For example, the indicator signals may indicate if the FIFO is ¼ full, ½ full, ¾ full, or the like. Such fullness indicator signals are called partial fullness indicator signals. These signals are typically important for producer circuits and consumer circuits to facilitate efficient flow of data items through the FIFO while preventing data loss that can occur if data is delivered to a FIFO that is completely full. These signals can be used to also prevent the consumer from reading from an empty FIFO.

The FIFO partial fullness indicator signals may be implemented relatively easily in RAM-based FIFO designs by knowing the total capacity of the FIFO and by monitoring the difference in value between the read and write pointers of the FIFO. Additionally, RAM-based FIFOs generally have multiple full/empty indicator signals which indicate the precise fullness values of the FIFO when only approximate values are needed. However, implementing partial fullness indicator signals in linear flow-through FIFOs is more complex, because monitoring the fullness or emptiness of individual stages of a FIFO does not generally yield steady signals as the fullness of a particular stage can be transitory and changes from empty to full and then back to empty again as a data item passes through the stage.

Figure 1A:
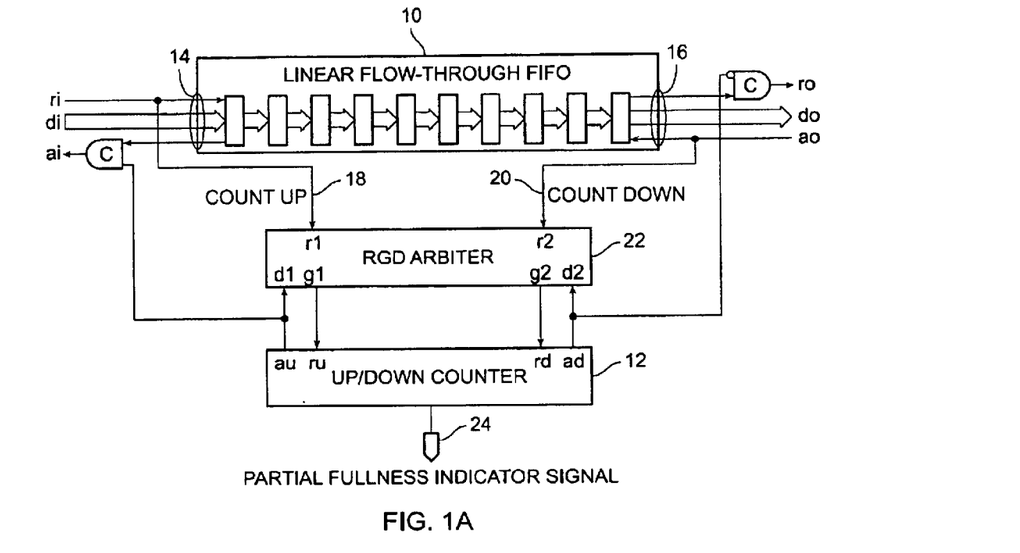
FIG. 1A depicts a prior art technique for indicating the partial fullness of a linear FIFO using an up-down counter.

FIG. 1A depicts a conventional technique for producing partial fullness signals 24 for a linear FIFO 10. Signals di and do represent the data input and data output of FIFO 10 respectively. Control signals request input ri, request output ro, acknowledge input ai, and acknowledge output ao facilitate the transfer of data items to and from FIFO 10. Request input signal ri indicates to FIFO 10 that a data item appearing at input di is valid and available to be stored by the first stage of FIFO 10. Request output signal ro indicates to a consumer that the data items appearing on output do is valid and available to be read from FIFO 10. Acknowledgment input signal ai indicates that the data item appearing on data input di has been stored in FIFO 10. Acknowledgment output signal ao informs FIFO 10 that the data item appearing on data output do has been read.

The embodiment shown in FIG. 1A uses an up-down counter 12 to measure the partial fullness of FIFO 10. Counter 12 generally has a lower bound value of zero, indicating an empty FIFO, and a upper bound value equal to the maximum capacity of FIFO 10, indicating a full FIFO. Counter 12 is incremented as data items are loaded into FIFO 10 via input port 14, and decremented as data items are read from FIFO 10 via output port 16. Although counter 12 is able to produce partial fullness signals, it suffers from several disadvantages. For example, counter 12 has to be carefully designed to accommodate independent count up 18 and count down 20 signals, and requires the use of an arbiter 22 to arbitrate the count up and count down requests as both these signals can be received at about the same time. Another disadvantage of such a counter is that the entry of a second data item into FIFO 10 must wait not just for the first data item to be stored in FIFO 10, but also for the count value to be incremented. This adversely affects the efficiency of FIFO 10. The C-elements and RGD Arbiter 22 are components well known to asynchronous circuit designers.

Figure 1B:
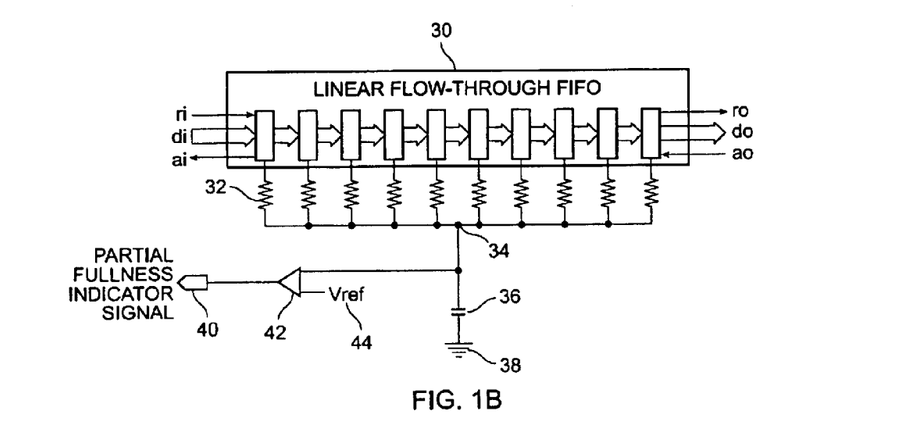
FIG. 1B depicts a prior art technique for indicating the partial fullness of a linear FIFO by detecting the fullness/emptiness of each individual stage of the FIFO.
Figure 2:
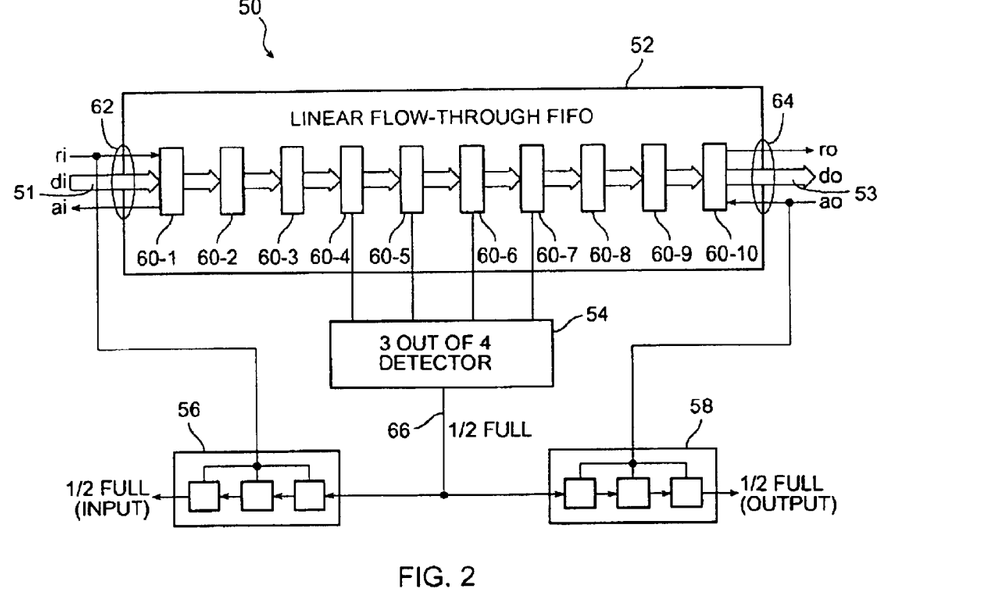
FIG. 2 depicts a technique for generating partial fullness indicator signals for a linear flow-through FIFO according to an embodiment of the present invention.

FIG. 1B depicts another conventional technique for producing a partial fullness indicator signal 40 for a linear FIFO 30. According to this technique, the fullness/emptiness of each individual stage of FIFO 30 is monitored to determine the partial fullness or partial emptiness of FIFO 30. As shown in FIG. 2, a resistor 32 is coupled to each individual FIFO stage and to a common node 34. A capacitor 36 is coupled between common node 34 and ground voltage 38. The voltage across each resistor is at a first voltage level when the stage connected to the resistor is full, and at a different voltage level when the stage is empty. Since the fullness of any stage carries the same weight as the fullness of any other stage, the voltage on capacitor 36 indicates the proportion of full stages in FIFO 30. FIFO partial fullness indicator signals 40 are obtained using voltage comparators 42 to compare the voltage on capacitor 36 with some reference voltages 44. A variant of this scheme uses currents rather than voltages to produce the fullness signals. Although this technique produces partial fullness indicator signals for a linear FIFO, this technique is quite expensive to implement. Since the voltage for each stage has to be measured, this technique requires a significant amount of additional circuitry, for example resistors connected to each stage, capacitor, comparators, etc., to produce the partial fullness signals. For large FIFOs, this technique requires a large number of wires to convey the fullness of each stage, and these wires are generally the expensive item in a chip. Due to the need for increased circuitry, this technique also reduces the amount of real estate available on a chip.

Thus, there is a need for techniques which can efficiently and accurately provide partial fullness indicator signals for a FIFO using minimal circuitry. It is desired that these techniques be able to generate fullness signals without having to monitor the fullness/emptiness of each individual stage of the FIFO.

SUMMARY OF THE INVENTION

The present invention relates to techniques for indicating partial fullness levels of a FIFO comprising a plurality of stages. A partial fullness detector is coupled to a subset of the plurality of stages of the FIFO, and is configured to output a signal indicating a partial fullness level of the FIFO.

According to an embodiment of the present invention, a m-out-of-n (where $m \leq n$) detector is used to output signals indicating the partial fullness level of a FIFO. The m-out-of-n detector is coupled to "n" stages of the FIFO and configured to output partial fullness indicator signals based on the full/empty states of the stages coupled to the m-out-of-n detector. The fullness levels indicated by embodiments of the present invention may include ½ full, ¼ full, ⅓ full, ⅔ full, or any other fractional fullness measures between 0 and 1, where 0 indicates an empty FIFO and 1 indicates a completely full FIFO.

According to an embodiment of the present invention, the m-out-of-n detector is configured to output the partial fullness indicator signal in a first state when "m" stages coupled to the m-out-of-n detector are full, and to output the partial fullness indicator signal in a second state when "m" stages coupled to the m-out-of-n detector are empty.

According to another embodiment of the present invention, the number of full stages of the FIFO lies in a first range when the m-out-of-n detector outputs the signal in the first state, and in a second range when the m-out-of-n detector outputs the signal in the second state. The bounds for the ranges may be determined based on the input and output rate characteristics and characteristics of the FIFO. According to an embodiment, the range of the number of full stages may be calculated based upon performance parameters associated with the FIFO and maximum data rates of a producer sending data to the FIFO and a consumer removing data from the FIFO.

According to yet another embodiment of the present invention, a m-out-of-n detector may be used to determine the partial fullness of a serial-concurrent-serial (SCS) FIFO comprising a plurality of branches each comprising a plurality of stages. In this embodiment, the m-out-of-n detector may be coupled to "n" stages of the SCS FIFO and configured to output a partial fullness indicator signal indicating a fullness level of the SCS FIFO. The m-out-of-n detector may be configured to output the partial fullness indicator signal in a first state when "m" stages coupled to the m-out-of-n detector are full, and to output the signal in a second state when "m" stages coupled to the m-out-of-n detector are empty.

According to another embodiment of the present invention, m-out-of-n detectors may be used to determine the partial fullness of a rectangular serial-concurrent-serial (SCS) FIFO comprising a distributor, a collector, and column FIFOs comprising a plurality of stages. In such an embodiment, the distributor is configured to distribute data items to the column FIFOs and the collector is configured to collect the data items from the column FIFOs. A first m-out-of-n detector may be coupled to "n" stages of a first column FIFO and may be configured to output a first signal indicating a fullness level of the first column FIFO. A second m-out-of-n detector may be coupled to "n" stages of a second column FIFO and configured to output a second signal indicating a fullness level of the second column FIFO. The first signal may be used to indicate to the producer when it should stop producing data items to the SCS FIFO. The second signal may be used to indicate to the consumer when it should stop removing data items from the SCS FIFO.

The foregoing, together with other features, embodiments, and advantages of the present invention, will become more apparent when referring to the following specification, claims, and accompanying drawings.

DESCRIPTION OF THE SPECIFIC EMBODIMENTS

The present invention relates to techniques for providing partial fullness indicator signals for linear FIFOs. FIG. 2 depicts an embodiment of a FIFO circuit 50 incorporating the teachings of the present invention. FIFO circuit 50 includes a linear flow-through FIFO 52, a 3-out-of-4 detector 54, an input synchronizer 56, and an output synchronizer 58. FIFO 52 includes a plurality of stages 60-1 through 60-10. Although FIFO 52 in FIG. 2 is shown to include 10 stages, in alternate embodiments of the present invention FIFO 52 can comprise "R" stages where "R," for the embodiment shown in FIG. 2, is any positive number greater than or equal to 4 (because a 3-out-of-4 detector is used). It should however be apparent that the scope of the present invention, as recited in the claims, is not limited by the number of stages in the FIFO. Data items are loaded into FIFO 52 from input port 62 end and are read out from FIFO 52 via output port 64 end.

In the embodiment depicted in FIG. 2, 3-out-of-4 detector 54 taps the four middle stages (60-4, 60-5, 60-6, and 60-7) of FIFO 52 and outputs a signal 66 which indicates the partial fullness level of FIFO 52. In FIG. 2, 3-out-of-4 detector 54 detects the fullness/emptiness of four consecutive stages of FIFO 52 coupled to detector 54. According to the teachings of the present invention for the embodiment depicted in FIG. 2, if three of the four stages are full, detector 54 outputs a TRUE signal. If three out of the four stages are empty, detector 54 outputs a FALSE signal. In the embodiment depicted in FIG. 2, partial fullness indicator signal 66 indicates when FIFO 52 is approximately half full.

The use of a 3-out-of-4 detector is merely illustrative of an embodiment of the present invention and is not meant to limit the scope of the invention as recited in the claims. The present invention may use any "m-out-of-n detector" provided that "m">"n/2". The implementation of the detector will be small with smaller values of "m" and "n." The trade-off in choosing values for "m" and "n" is between accuracy and the circuit complexity in the implementation. Higher values for "m" and "n" provide detectors which are more accurate but which are more complex to implement.

Input synchronizer 56 and output synchronizer 58 may be used to synchronize the partial fullness indicator signal 66 with the input and output interfaces respectively. FIG. 2 depicts a 3-stage synchronizer for both the input and output sides. Other numbers of stages in the synchronizer can be chosen dependent upon the circuit characteristics and the speed of operation.

According to the teachings of the present invention, in order to derive accurate estimates about the fullness of FIFO 52, the input interface i.e. the interface between a producer of data items and FIFO 52, and the output interface i.e. the interface between a consumer of data items and FIFO 52, are slower than the interfaces between the stages of FIFO 52. Accordingly, the input rate of FIFO 52 is chosen such that at most one stage out of every two stages of FIFO 52 is full when filling an empty FIFO, until it is half full, after which the FIFO is permitted to fill at any rate. Likewise, the output rate of FIFO 52 is chosen such that at most one out of every two stages is empty when emptying a full FIFO, until it is half empty, after which the FIFO is permitted to empty at any rate. In FIG. 2, the slower interfaces have been depicted by pinched data arrows 51 and 53, entering the first stage of FIFO 52 and coming out of the last stage of FIFO 52 respectively.

In order to understand the working of the embodiment of the present invention depicted in FIG. 2, consider a starting state, when FIFO 52 is empty, with data items entering FIFO 52 at maximum input rate via input port 62 and being consumed from FIFO 52 at a maximum output rate via output port 64. The maximum input rate is limited by the speed of the interface between the producer of data items and FIFO 52. Similarly, the output rate is limited by the speed of the interface between the consumer of the data items and FIFO 52. Accordingly, when an empty FIFO 52 is being filled, at most two of the signals of detector 54 will indicate fullness of the corresponding stage at any given instant. With other FIFO implementations, different values of "m" and "n" (for the m-out-of-n detector) maybe chosen to match a particular FIFO configuration. For example, a FIFO implementation which has 3-out-of-5 consecutive stages full when filling an empty FIFO.

When the input rate is higher than the output rate, FIFO 52 will tend to start filling first at the output port 64 end of FIFO 52. As the data items get backed up towards the center portion of FIFO 52, more of the center stages coupled to detector 54 will report that they are full. When 3 of the 4 stages tapped by 3-out-of-4 detector 54 report that they are full, the FIFO partial fullness indicator signal 66 indicating half fullness of FIFO 52 is set to TRUE. When signal 66 is set to TRUE, it indicates that FIFO 52 is "at least approximately half full." The "at least approximately half full" signal indicates that FIFO 52 can also be less than half full. Thus, when partial fullness indicator signal 66 is set to TRUE, the number of full stages of FIFO 52 lie within a particular range, where the lower bound of the range varies with the input and output rate of FIFO 52, and the forward and reverse latency of the individual stages of FIFO 52. The relationship between the bounds of the ranges and the various parameters of FIFO 52 are described below.

If the input data rate becomes slower than the output data rate, stages of FIFO 52 will tend to start emptying first from the input port 62 end of the FIFO and then proceed towards the center region of FIFO 52. When 3 of the 4 stages tapped by 3-out-of-4 detector 54 report that they are empty, partial fullness indicator signal 66 indicating half fullness of FIFO 52 is set to FALSE. When signal 66 is set to FALSE, it indicates that FIFO 52 is "at most approximately half full." The "at most approximately half full" signal indicates that FIFO 52 can be slightly more than half full. Thus, when partial fullness indicator signal 66 is set to FALSE, the occupancy of linear FIFO 52 lies within a particular range, where the upper bound of the range varies with the input and output rate of FIFO 52, and the forward and reverse latency of the individual stages of FIFO 52. The relationship between the bounds of the ranges and the various parameters of FIFO 52 are described below.

When a data item moves forward through the FIFO, a corresponding bubble (a bubble indicates "the absence of a data item") moves backwards. The above described hysteresis in 3-out-of-4 detector 54 prevents the half full signal 66 from changing each time a bubble moves backwards and a corresponding new data item ripples through the stages of FIFO 52.

Figure 3A:
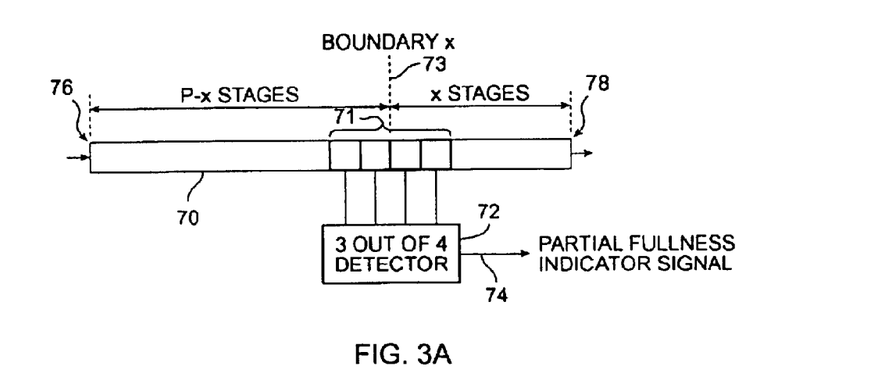
FIGS. 3A and 3C depict embodiments of a linear flow-through FIFO incorporating the teachings of the present invention.

As described above, the partial fullness indicator signal according to the teachings of the present invention provides a reliable estimate for the range of the number of full stages in a FIFO. The relationships between the bounds of the ranges and the various parameters of a FIFO may be determined using FIFO 70 depicted in FIG. 3A. FIG. 3A depicts a linear flow-through FIFO 70 comprising "P" stages and having an input port 76 and an output port 78. A 3-out-of-4 detector 72 is connected to four consecutive stages 71 of FIFO 70. Detector 72 records the full/empty states of the four stages of FIFO 70 and uses the state information to generate a partial fullness indicator signal 74 for FIFO 70. Detector 72 outputs a TRUE signal if three of the four stages coupled to detector 72 are full, and outputs a FALSE signal if three of the four stages are empty. Otherwise, the output of detector 72 maintains its current output value. As depicted in FIG. 3A, detector 72 is connected to stages 71 of FIFO 70 such that there are "x" stages between the center 73 of detector 72 and output port 78 of FIFO 70, and "P-x" stages between input port 76 of FIFO 70 and center 73 of detector 72. For a detector configured to report that the FIFO is "approximately half-full," the value of "x" is chosen to be x=P/2.

In general, when 3-out-of-4 detector 72 outputs a TRUE signal, the number of full stages in FIFO 70 is in a certain range, and the lower bound of the range depends upon factors such as the input rate, output rate, forward latency of the individual FIFO stages, and reverse latency of the individual FIFO stages. Likewise, when 3-out-of-4 detector 72 outputs a FALSE signal, the number of full stages of FIFO 70 varies within a certain range and the upper bound of the range again depends upon factors such as the input rate, output rate, forward latency of the individual FIFO stages, and reverse latency of the individual FIFO stages.

Output signal 74 of detector 72 exhibits hysteresis when changing from FALSE to TRUE and back to FALSE. When signal 74 of detector 72 changes from FALSE to TRUE, fullness "Y" (shown in FIG. 3B) indicates the number of data items that can still be input into FIFO 70, while when signal 74 of detector 72 changes from TRUE to FALSE, fullness "Z" (shown in FIG. 3B) indicates the number of data items that can still be removed from FIFO 70.

Figure 3B:
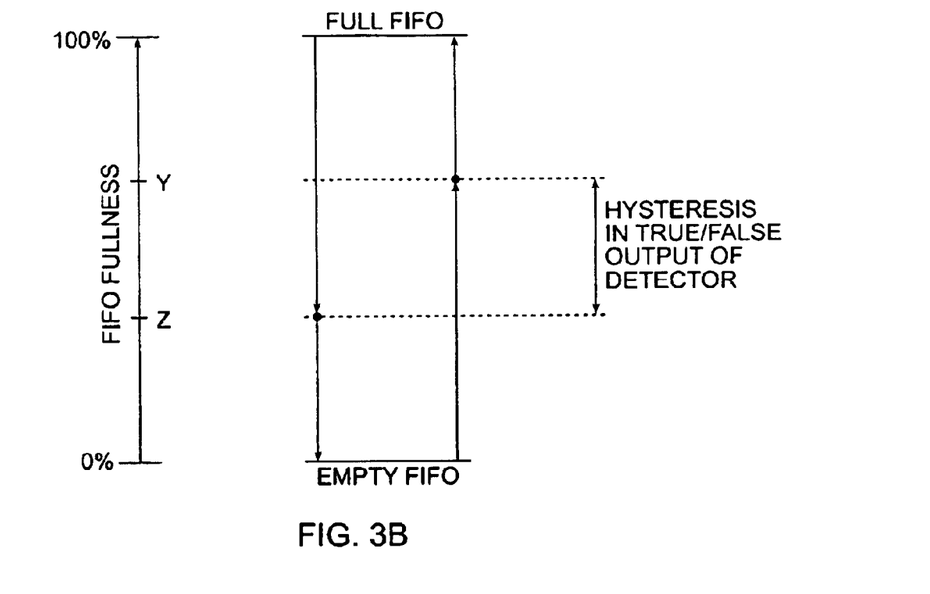
FIG. 3B depicts hysteresis exhibited by the output signal of a m-out-of-n detector when changing from FALSE to TRUE and back to FALSE according to an embodiment of the present invention.

For example, if signal 74 from detector 72 is FALSE, the range for the number of empty stages is known to be at least (100−Y)%, and as a result the number of data items that can be still input into FIFO 70 at the maximum input rate can be calculated, as will be described shortly. The moment that signal 74 from detector 72 becomes TRUE, it is known that there are enough empty stages in FIFO 70 to accommodate this maximum number of items. For example, often these empty stages are needed to store data items that may be in flight in a communication channel before the producer stops sending the data items. If signal 74 from detector 72 is TRUE, the range of the number of full stages is known to be at least Z%, and as a result the number of data items that can be removed from FIFO 70 at the maximum output rate can also be calculated. FIFO 70 may contain more than this number of data items, but these additional data items may not be available to be read from the output port of FIFO 70 at the maximum rate. The moment that signal 74 from detector 72 becomes FALSE, it is known that there are at least that many items that can still be output from FIFO 70. For example, it might take the consumer some period of time to respond to the change of the FIFO fullness signal, and it might continue to read several items from the FIFO before it stops.

In order to determine the lower and upper bounds for the ranges, the following parameters are defined to describe the characteristics of a FIFO such as FIFO 70 depicted in FIG. 3A:

(1) Number of Stages: P

The total number of stages in FIFO 70.

(2) Number of Full Stages: nFull

The number of full stages in FIFO 70.

(3) Stage Boundary at which 3-out-of-4 Detector is placed: x

The stage boundary of FIFO 70 at which the m-out-of-n detector is placed.

(4) Data Item Density of FIFO: $d_f$

The data item density of FIFO 70 at maximum throughput is the fraction of full stages in any sufficiently long consecutive part of FIFO 70. The parameter can be expressed by $d_f = L_f/(L_f+L_r)$, where $L_f$ is the forward latency through a single FIFO stage and $L_r$ is the reverse latency through a single FIFO stage. The units of $d_f$ are "data items per stage." For example, a FIFO with $d_f=\frac{1}{2}$, indicates 1 data item per 2 stages; and a FIFO with $d_f=\frac{2}{3}$, indicates 2 data items per 3 stages.

(5) Bubble Density of FIFO: $d_r$

The bubble density of FIFO 70 at maximum throughput is the fraction of empty stages in any sufficiently long consecutive part of FIFO 70. The parameter can be expressed by $d_r = L_r/(L_f+L_r)$, where $(d_r+d_f)=1$. The units for $d_r$ are "bubbles per stage." For example, a FIFO with $d_r=\frac{1}{2}$, indicates 1 bubble per 2 FIFO stages; and a FIFO with $d_r=\frac{1}{3}$, indicates 1 bubble per 3 FIFO stages.

(6) Normalized Input Rate: $r_{in}$

The normalized input rate is the maximum input rate $f_{in}$ (in data items per second) divided by the maximum FIFO throughput $f_{FIFO}$:

$$r_{in} = \frac{f_{in}}{f_{FIFO}}$$

$r_{in}$ has no units. Further, the maximum FIFO throughput is the reciprocal of the minimum cycle time of a stage $(=L_f+L_r)$:

$$f_{FIFO} = \frac{1}{(L_f + L_r)}.$$

The parameter $f_{in}$ indicates the maximum number of data items per second that a producer can deliver to FIFO 70. This rate is set by the producer and can be at most the maximum rate of FIFO 70, $f_{FIFO}$. The normalized input rate expresses how much slower the producer is compared to the maximum throughput of FIFO 70. The value for $r_{in}$ ranges between 0 and 1 ($0 \leq r_{in} \leq 1$), because it is not possible to enter data items into the FIFO faster than it can accept them.

(7) Normalized Output Rate: $r_{out}$

The normalized output rate is the maximum output rate normalized to the maximum FIFO throughput:

$$r_{out} = \frac{f_{out}}{f_{FIFO}}.$$

The parameter $f_{out}$ expresses the maximum number of data items per second that a consumer can remove from FIFO 70. This rate is set by the consumer and can be at most the maximum rate of FIFO 70, $f_{FIFO}$; the consumer cannot remove data items from the FIFO at a greater rate than the FIFO can deliver them. The normalized output rate expresses how much slower the consumer is compared to the maximum throughput of FIFO 70. The value of $r_{out}$ ranges between 0 and 1 ($0 \leq r_{out} \leq 1$). The normalized output rate is unitless.

(8) Data Item Density at Maximum Input Rate: ($I_d$)

The data item density in the FIFO at the maximum input rate is the number of data items per stage, and is equivalent to the normalized input rate times the data item density of the FIFO, i.e. $I_d=(r_{in}*d_f)$ Based on the parameters described above, the data item density at the maximum input rate is expressed as:

$$r_{in} * d_f = \frac{f_{in}}{f_{FIFO}} * \frac{L_f}{(L_f + L_r)}$$

Substituting for $f_{FIFO}$ yields:

$$r_{in} * d_f = f_{in} * (L_f + L_r) * \frac{L_f}{(L_f + L_r)}$$

The stage cycle time components $(L_f+L_r)$ cancel, leaving:

$$r_{in}*d_f = f_{in}*L_f$$

Accordingly, the data item density ($I_d$) at maximum input rate is ($f_{in}*L_f$).

(9) Bubble Density at Maximum Output Rate: ($B_d$)

The bubble density in the FIFO at the maximum output rate is the number of bubbles per stage, and is equivalent to the normalized output rate times the bubble density of the FIFO, i.e. $B_d=(r_{out}*d_r)$ The bubble density at maximum output rate can be determined in a manner similar to the data item density at maximum input rate ($I_d$). After performing algebra, it can be determined that the bubble density at maximum output rate ($B_d$) is equivalent to ($f_{out}*L_r$).

From the position of 3-out-of-4 detector 72, a first approximation can be made as to how many stages are full when detector 72 outputs a TRUE signal and when detector 72 outputs a FALSE signal. For example, a first approximation may conclude that when detector 72 outputs a TRUE signal, there are more than x full stages, and when detector 72 outputs a FALSE signal, there are fewer than x full stages. These bounds may then be adjusted depending on the values of the data item density at maximum input rate ($I_d$) and the bubble density at maximum output rate ($B_d$). The lower and upper bounds for the ranges for the number of full and empty stages are given below. When 3-out-of-4 detector 72 outputs a TRUE signal, the following range for nFull applies:

$$x(1-B_d) \leq n\text{Full} \leq P \text{ when } (I_d < \tfrac{1}{2}) \qquad \text{Inequality (1)}$$

When a m-out-of-n detector is used, the term "½" in inequality 1 is substituted by "(n−m+1)/n".

Inequality (1) expresses that when the data item density at maximum input rate ($I_d$) is ½, then the number of full stages is between $x(1-B_d)$ and P. The lower bound $x(1-B_d)$ on nFull becomes closer to x as the bubble density at maximum output rate ($B_d$) decreases.

When $I_d \geq \tfrac{1}{2}$ other ranges apply. The preferred region of operation, however, is the region where $I_d < \tfrac{1}{2}$. This region of operation applies in most practical situations, as will be illustrated later.

For reasons of symmetry the expressions when detector 72 outputs a FALSE signal can be expressed as follows:

$$0 \leq n\text{Full} \leq (x + I_d*(P-x)) \text{ when } (B_d < \tfrac{1}{2}) \qquad \text{Inequality (2)}$$

Figure 3C:
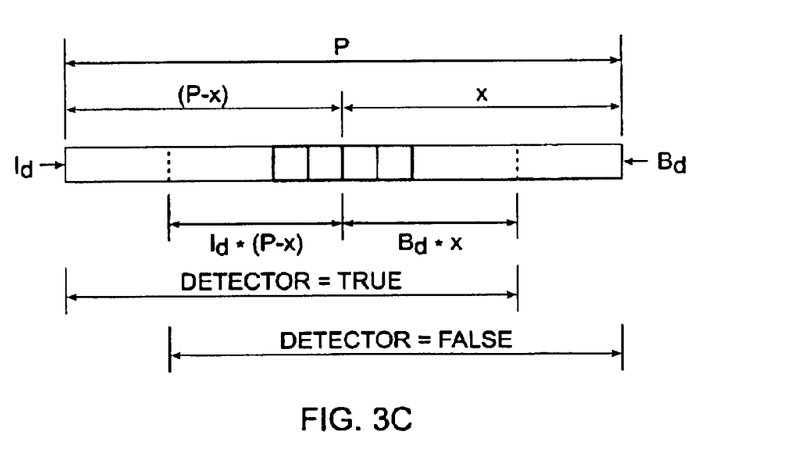

Inequalities (1) and (2) indicate that the adjustments to the initial approximation of x are given by $-(B_d*x)$ and $+(I_d*(P-x))$ respectively. This has been graphically indicated in FIG. 3C. When the detector reports TRUE, then under maximum input rate conditions, the FIFO will be somewhere between 100% full and $((100*P)/(x(1-B_d)))$ % full. These two values can be used to express the tolerance range of the fullness indicator. A lower tolerance means better accuracy in the fullness measurement. From the above inequalities, the accuracy of the fullness indicator improves, i.e. its tolerance range decreases as any one or more of $r_{in}$, $r_{out}$, $d_f$, and $d_r$ decrease. For example, to have a tolerance of at most 1 full stage when detector 72 outputs a TRUE signal, the bubble density ($B_d$) must be set such that $B_d \leq 1/x$; i.e. the bubble density must be at most one bubble per x stages, which indicates that the bubble density at maximum output rate is at most one bubble per x stages. The lower bound when the detector is TRUE is $x(1-B_d)$. Thus, the lower bound is $(x-1)$ when $(B_d*x) \leq 1$ i.e., $B_d \leq 1/x$.

Similarly, to have a tolerance of at most 1 full stage when detector 72 outputs a FALSE signal, the item density must be set such that $I_d*(P-x) \leq 1$. Therefore, $I_d \leq 1/(P-x)$ i.e., the data item density at maximum input rate ($I_d$) needs to be set such that $I_d \leq 1/(P-x)$. This implies that the data item density must be at most one item per (P−x) stages.

The accuracy of the fullness indication that a particular m-out-of-n detector reports increases when either the data item density at maximum input rate ($I_d$) is lowered, or the bubble density at maximum output rate ($B_d$) is lowered, or both. For a 3-out-of-4 detector, the preferred region of operation is with a maximum input rate that results in a data item density $I_d$ of less than or equal to ½, and with a maximum output rate that results in a bubble density $B_d$ of less than or equal to ½.

In a linear flow-through FIFO operating in this region, it implies restricting the input and output data rates to the FIFO to less than or equal to 50% of its maximum operating rates. However, in larger FIFOs configured in Serial-Concurrent-Serial (SCS) arrangements, operating the linear FIFO segments of such a parallel array of FIFOs at less than half their maximum rate is less of a penalty.

As an example, consider a FIFO where $d_f = \tfrac{2}{3}$ and $d_r = \tfrac{1}{3}$. If the maximum input and output rate is a third of the maximum throughput of the FIFO, i.e. the normalized input and output rates are ⅓, then $$B_d = r_{out}*d_r = \tfrac{1}{3}*\tfrac{1}{3} = \tfrac{1}{9}, \text{ thus } B_d < \tfrac{1}{2}$$

and $$I_d = r_{in}*d_f = \tfrac{1}{3}*\tfrac{2}{3} = \tfrac{2}{9}, \text{ thus } I_d < \tfrac{1}{2}.$$

With $B_d < \tfrac{1}{2}$ and $I_d < \tfrac{1}{2}$, the FIFO will be operating in the preferred region where inequalities (1) and (2) apply.

The validity of each of the ranges described above can be ascertained by showing that any value in the range can be reached and that any value outside the range cannot be reached, as illustrated below.

The validity of inequality (1) may be proven by showing that for any value for nFull in the range $x(1-B_d) \leq n\text{Full} \leq P$ can be reached. In order to prove this inequality, assume that FIFO 70 is filled up such that stages one through (x+1) are full and all other stages are empty, where stage one is the output stage. Only after the last item has been loaded into FIFO 70 will three stages in 3-out-of-4 detector 72 report full, and detector 72 will output a TRUE signal. Subsequently, if FIFO 70 is drained at the maximum output rate, the number of bubbles in the x stages at any time is at most $(B_d*x)$. This implies that just before the second bubble has reached 3-out-of-4 detector 72, causing detector 72 to output a FALSE signal, the number of full stages will be at least $x(1-B_d)$.

During the emptying of FIFO 70, detector 72 continues to output a TRUE signal when $x(1-B_d) \leq n\text{Full} \leq (x+1)$. Accordingly, any state of FIFO 70 can be reached where $x(1-B_d) \leq n\text{Full} \leq (x+1)$. Any other state can also be reached where more than (x+1) stages are full and signal 74 from detector 72 is TRUE, by filling FIFO 70 further instead of draining it.

The assertion that no value for nFull outside the range of inequality (1) can be reached may be proven as follows. In order to maintain signal 74 from detector 72 in a TRUE state, while draining FIFO 70 as much as possible, the consumer and producer may work together. The producer, however, cannot sustain a data item density of ½ or more, which is needed to keep signal 74 in a TRUE state. From this property it may be deduced that the least number of full stages in the TRUE state is achieved when the producer stops producing data items and the consumer drains FIFO 70 as much as possible. This achieves the lower bound of $x(1-B_d)$ full stages when signal 74 output from detector 72 is TRUE.

The ranges for nFull when the output of detector 72 is FALSE may be derived from the ranges when the output of detector 72 is TRUE by reasons of symmetry. During the analysis, the "bubbles" (i.e. the number of empty stages) present in FIFO 70 are analyzed instead of the data items. Based on the premise that a forward-propagating data item can be interchanged for a backward-propagating bubble, the following substitutions may be made to derive the range bounds for when the output of detector 72 is FALSE.

$$x \rightarrow P-x$$

$$r_{out} \rightarrow r_{in}$$

$$d_f \rightarrow d_r$$

$$n\text{Full} \rightarrow n\text{Empty}$$

Substituting the above values in inequality (2), $$((P-x)-I_d*(P-x)) \leq n\text{Empty} \leq P$$

Using $n\text{Empty}=(P-n\text{Full})$ yields $$0 \leq n\text{Full} \leq (x+I_d*(P-x))$$

Based on the above, in order to obtain accurate estimates for the partial fullness levels, a FIFO should be used where the data item density at maximum input rate ($I_d$) and the bubble density at maximum output rate ($B_d$) are small. If these densities are small enough, then there are at least $x(1-B_d)$ full stages in FIFO 70 when signal 74 of detector 72 is TRUE, and at least $(P-x)(1-I_d)$ empty stages when signal 74 is FALSE. Accordingly, the moment signal 74 of detector 72 changes from TRUE to FALSE, there are at least $x(1-B_d)$ data items that can be output at maximum output rate. Similarly, the moment signal 74 from detector 72 changes from FALSE to TRUE, there is space for $(P-x)(1-I_d)$ data items that can be input at maximum input rate. In a preferred embodiment of the present invention, the values of $I_d$ and $B_d$ are chosen to be as small as possible so as to maximize the accuracy of the partial fullness estimation when detector 72 switches state. Preferably the values of $I_d$ and $B_d$ are chosen to be less than half. Lower values of $I_d$ and $B_d$ will result in more accurate estimates of partial fullness of FIFO 70.

For example, consider a FIFO of length 40 with a normalized input rate of $r_{in}=1/10$ and a normalized output rate of $r_{out}=1/10$. Further, assume that for this FIFO $d_f=2/3$ and $d_r=1/3$. The data item density at maximum input rate ($I_d$) may be calculated as $1/10 * 2/3 = 1/15$ and the bubble density at maximum input rate ($B_d$) may be calculated as $1/10 * 1/3 = 1/30$. Thus, both values are much less than ½. Furthermore, let x=20, which implies that 3-out-of-4 detector 72 is placed at the middle of the FIFO. When the output signal 74 from detector 72 is TRUE, then there are at least $20*(1-1/15)=18\frac{2}{3}$ full stages in the FIFO. Since the FIFO can have only a discrete number of full stages, this implies that there are at least 18 full stages when signal 74 is TRUE. Similarly, when signal 74 is FALSE, there are at least $$20*(1-1/30) = 20 - 2/3 = 19\frac{1}{3} \text{ empty stages.}$$

Consequently, when signal 74 from detector 72 changes from FALSE to TRUE, at least 19 input data items "in flight" can still be accepted into the FIFO. When signal 74 switches from TRUE to FALSE, at least 18 data items can still be removed from the FIFO.

Figure 4:
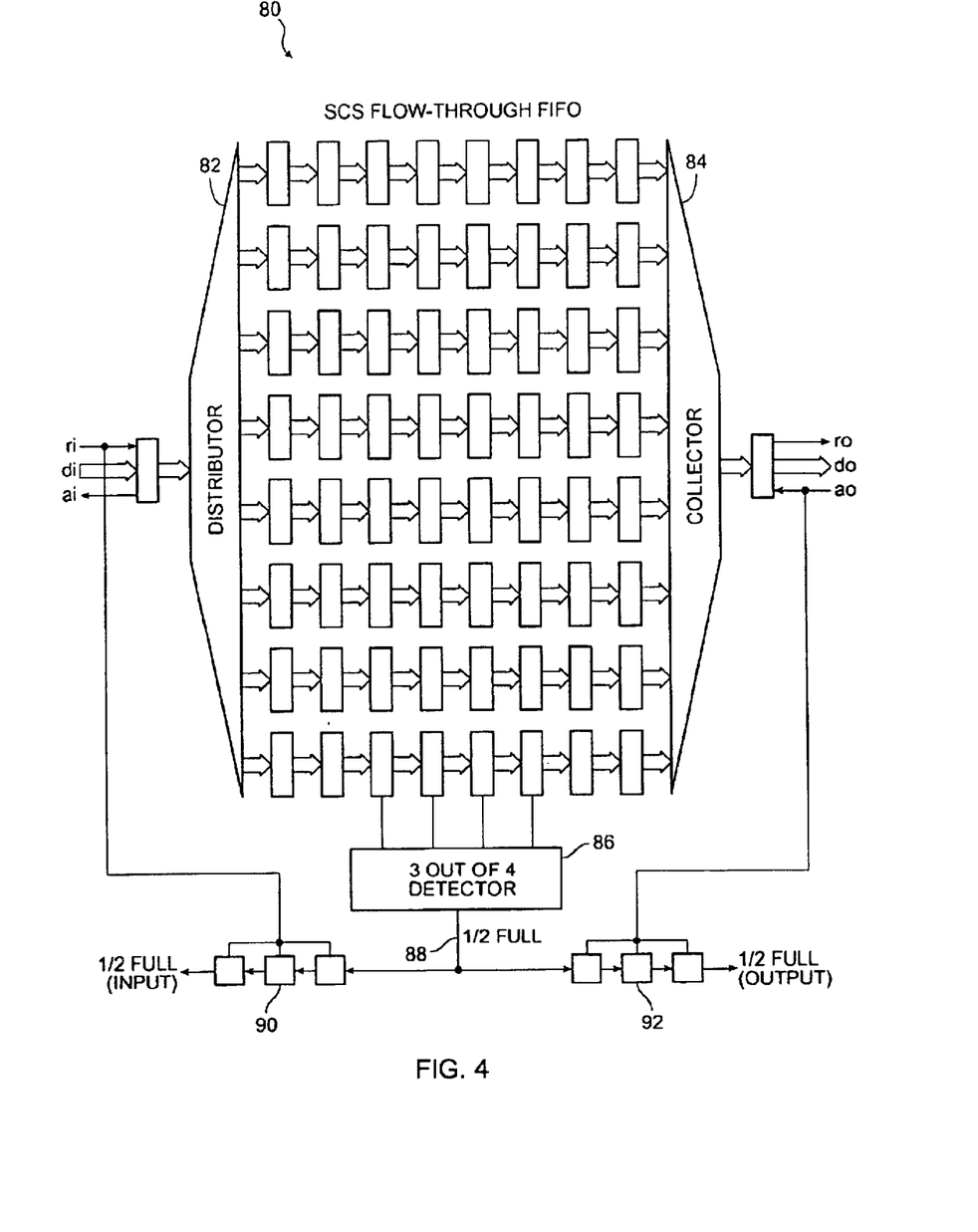
FIG. 4 depicts an embodiment of the present invention used to indicate partial fullness of a SCS FIFO.

The FIFO partial fullness indication technique of the present invention is well suited for indicating the partial fullness of Serial-Concurrent-Serial (SCS) FIFOs. FIG. 4 depicts an embodiment of the present invention used in conjunction with a SCS FIFO 80. SCS FIFO 80 is a 8-way SCS FIFO including eight branch FIFOs each comprising eight stages. It should be apparent that SCS FIFO 80 depicted in FIG. 4 is merely an illustration of an embodiment of the present invention and the number of branches in a SCS FIFO or the number of stages per branch do not limit the scope of the present invention as recited in the claims. The embodiment depicted in FIG. 4 also includes a distributor circuit 82 for loading (or distributing) data items into FIFO 80, a collector circuit 84 for reading (or collecting) data items from FIFO 80, a 3-out-of-4 detector 86 coupled to the middle four stages of one branch of FIFO 80, an input synchronization circuit 90, and an output synchronization circuit 92.

Distributor circuit 82 is used for distributing the incoming data items among the branches of FIFO 80. A variety of distribution schemes known to those skilled in the art may be used. According to the present invention, distributor circuit 82 distributes data items uniformly among the branch FIFOs of SCS FIFO 80. Collector circuit 84 generally mirrors distributor circuit 82 to maintain the first-in-first-out order of the data items from the input of SCS FIFO 80 to its output.

The partial fullness detection technique according to the present invention is well suited for SCS FIFOs where the input and output rates of each of the branch FIFOs are automatically constrained by distribution circuit 82 and collection circuit 84. Thus, with "g" branches, the branch FIFOs receive I/O at the rate of 1/g. Furthermore, the stages in the branch FIFOs are generally simpler and thus faster than the distributor and collector stages. Accordingly, distribution circuit 82 and collection circuit 84 automatically provide reduced data rate "bottlenecks" at the input and output ports of each of the parallel branch FIFOs of SCS FIFO 80. Increasing the number of parallel FIFOs makes the bottleneck narrower, since each of the "g" parallel FIFOs have only $(1/g)^{th}$ the input and output rate of complete SCS FIFO 80. Narrower bottlenecks allow the use of the present invention on a single parallel branch FIFO as illustrated in FIG. 4. Based on the characteristics of distributor 82 and collector 84 of SCS FIFO 80, formulae may be derived for SCS FIFO 80, that specify the tolerance range on the fullness indicator signal 88, in a similar manner to that described earlier for the linear FIFO.

Although 3-out-of-4 detector 86 in FIG. 4 is placed at the center of a FIFO branch, in alternate embodiments of the present invention, detector 86 may be placed closer to the input or closer to the output ports of a FIFO branch depending on the level of fullness to be measured.

Figure 5:
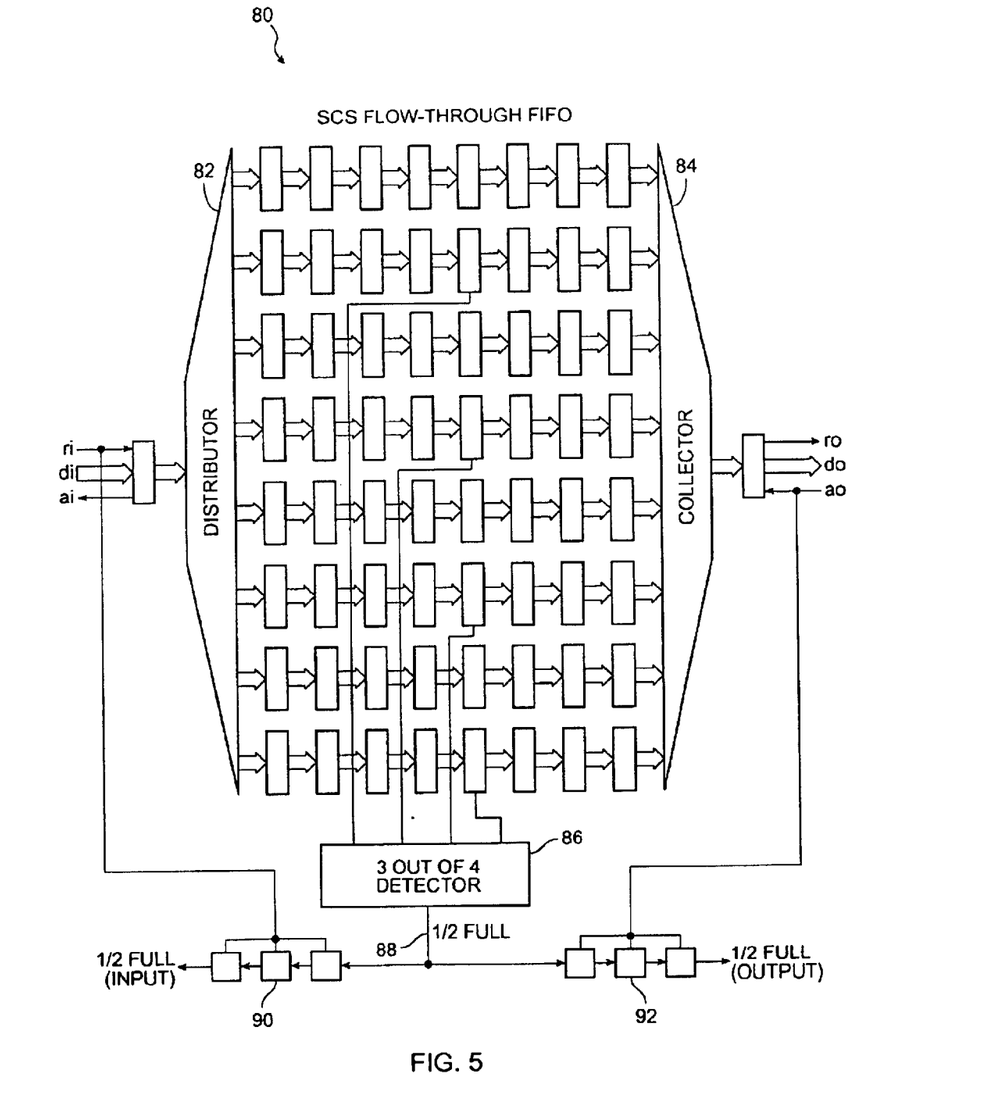
FIG. 5 depicts another embodiment of the present invention used to indicate partial fullness of a SCS FIFO.

FIG. 5 depicts an alternate way of coupling detector 86 to SCS FIFO 80 according to an embodiment of the present invention. In this embodiment, FIFO fullness signals 88 may be generated by placing the tap points of detector 86 at stages of different branches of SCS FIFO 80. As shown in FIG. 5, the tap points have been placed close to the center of every alternate FIFO branch of SCS FIFO 80. This approach is potentially less practical since it requires long wires threading through the center of the dense FIFO array. Also partial fullness signal 88 derived from this embodiment may be less accurate since there is more likelihood that multiple inputs of 3-out-of-4 detector 86 will be changing at once. However, as illustrated in FIG. 5, the m-out-of-n detector need not be coupled to consecutive stages of a linear FIFO. In the embodiments shown in FIG. 4 and FIG. 5, synchronizers 90, and 92 may be added to provide the fullness signals to the input and output interfaces.

Figure 6:
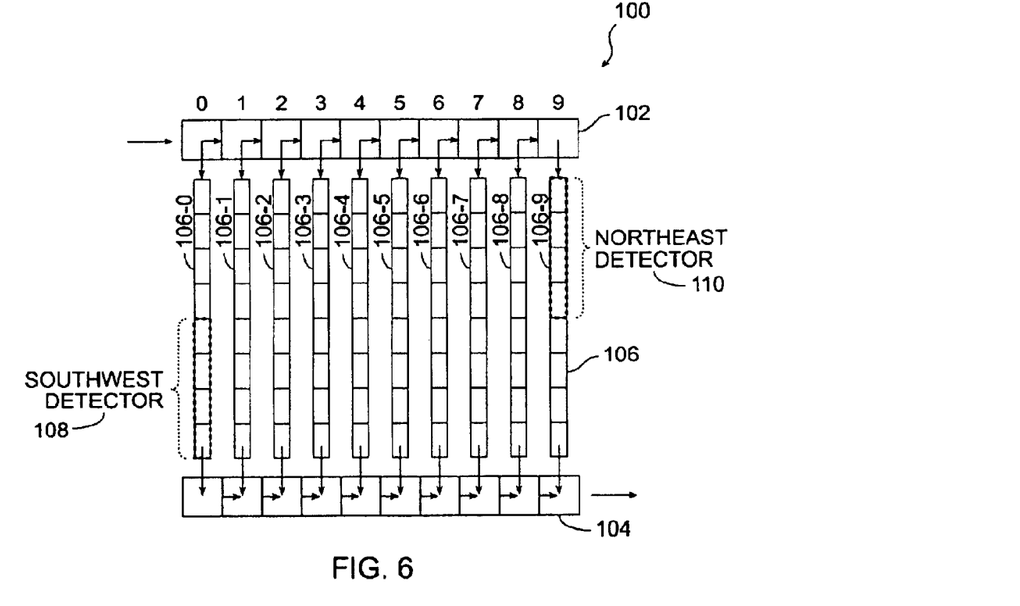
FIG. 6 depicts an embodiment of the present invention used to indicate partial fullness of a rectangular SCS FIFO.

FIG. 6 depicts an embodiment of the present invention used in conjunction with a rectangular FIFO, or more specifically square FIFO 100, which is a special type of a SCS FIFO. For further details related to a SCS FIFO please refer to U.S. patent application Ser. No. 09/677,442 entitled "ASYNCHRONOUS IMPLEMENTATION OF A MULTI-DIMENSIONAL, LOW LATENCY, FIRST-IN, FIRST-OUT (FIFO) BUFFER" filed Sep. 29, 2000, the entire contents of which are herein incorporated by reference for all purposes. FIG. 6 depicts a 10-by-10 square FIFO 100 comprising two row FIFOs 102 and 104, and ten column FIFOs 106-0, 106-1, 106-2, 106-3, 106-4, 106-5, 106-6, 106-7, 106-8, and 106-9 (106). A m-out-of-n detector 110 is coupled to one of the columns of square FIFO 100 (northeast detector) and another m-out-of-n detector 108 may be coupled to another column of square FIFO 100 (southwest detector). Data items flow through top row 102 until they drop down a particular column FIFO. Each column FIFO 106 has eight cells and is a flow-through FIFO. For purposes of explaining the functionality of square FIFO 100, top row FIFO 102 which acts as a distributor, and bottom row FIFO 104 which acts as a collector are not considered part of the column FIFOs. Data items drop into the column FIFOs 106 in a round-robin fashion, for example, in the order: column 106-9, 106-8, 106-7, 106-6, 106-5, 106-4, 106-3, 106-2, 106-1, 106-0. Data items are extracted from column FIFOs 106-9, 106-8, 106-7, 106-6, 106-5, 106-4, 106-3, 106-2, 106-1, 106-0 and collected in bottom row 104, such that the data items are available at the output port of square FIFO 100 in the same order as they entered at the input port.

In one embodiment of square FIFO 100, its environment is chosen with input and output data rates that are equal to the maximum throughput of a single column FIFO 106. This configuration produces maximum throughput of square FIFO 100.

The following example calculations illustrate how many empty or full stages there are in the FIFO. Data items are distributed to and collected from column FIFOs 106-0, 106-1, 106-2, 106-3, 106-4, 106-5, 106-6, 106-7, 106-8, and 106-9 in a round-robin order, and thus the normalized input data rate ($r_{in}$) and the normalized output data rate ($r_{out}$) of each column FIFO 106 are both $1/10$ in square FIFO 100 shown in FIG. 6., as the data items are distributed over the ten columns in a round-robin fashion. Accordingly, the normalized input rate $r_{in}=1/10$, and the normalized output rate $r_{out}=1/10$.

Detector 110 placed in the northeast corner of square FIFO 100 is used to provide a fullness signal to the producer that is sending data items to square FIFO 100 indicating the FIFO is nearing full. If northeast detector 110 outputs a TRUE signal, the producer must stop sending data items into square FIFO 100. This does not produce a problem provided that there are enough empty stages in square FIFO 100 to accommodate all of the data items in flight. Since there may be a delay in transmitting the stop signal to the producer, there may be a number of data items in flight before the producer stops producing the data items. When the partial fullness indicator signal output from northeast detector 110 becomes FALSE, the producer may again start sending data items into square FIFO 100. There may also be a delay between when this partial fullness signal becomes FALSE and when the producer starts sending further data items to the input port of square FIFO 100.

For square FIFO 100, it is important to determine the maximum number of data items that a producer can still send when the signal from northeast detector 110 becomes TRUE. For example, if for square FIFO 100 with a data item density of the column FIFOs 106 chosen to be $2/3$ (i.e. $d_f=2/3$), and the bubble density of the column FIFOs 106 chosen to be $1/3$ (i.e. $d_r=1/3$), then the data item density at maximum input rate ($I_d$) is $$I_d=1/10*2/3=2/30.$$

Similarly, the bubble density ($B_d$) at maximum output rate is $$B_d=1/10*1/3=1/30.$$

Since the values for the data item density at maximum input rate ($I_d$) and the bubble density at maximum output rate ($B_d$) are below $1/2$, the range for the number of full stages when the output from detector 110 becomes TRUE is expressed by inequality (1) stated above. From inequality (1), when detector 110 output signal becomes TRUE, there are at least two stages empty in the last column, i.e., column 106-9 of square FIFO 100. This result can also be found more directly because the northeast detector is placed at the input end of column FIFO 106-9, and thus when this 3-out-of-4 detector reports FALSE, there will be at least 2 empty stages among these 4 stages.

It is also important to determine the relationship between the number of empty stages in the other column FIFOs and the number of empty stages in column FIFO 106-9. The relation depends on the order in which data items are inserted and removed from the column FIFOs. The column FIFOs, however, operate independently and concurrently and are not restricted to accept or deliver data items in any specific order. Distributor FIFO 102 and collector FIFO 104 place an ordering on the delivery and collection of data items to and from column FIFOs 106-0, 106-1, 106-2, 106-3, 106-4, 106-5, 106-6, 106-7, 106-8, and 106-9. This order changes depending upon the availability of empty stages at the input ports of each column FIFO. The strict round-robin order of data items entering the column FIFOs is maintained when data items are delivered to distributor FIFO 102 at less than the maximum rate (referred to as the "data item limited region" of FIFO operation), and collector FIFO 104 is collecting data items from the column FIFOs at less than the maximum rate, i.e. collector FIFO 104 is delivering bubbles at less than the maximum rate (referred to as the "bubble limited region" of FIFO operation). An order in insertions is enforced when the distribution network, top row 102, operates in the data item-limited region. The collection network, bottom row 104, enforces an order in removals from the column FIFOs, if it operates in the bubble-limited region. When northeast detector 110 output switches to the TRUE state, top row 102 operates in the data item limited region and bottom row 104 operates in the bubble-limited region.

Figure 7A:
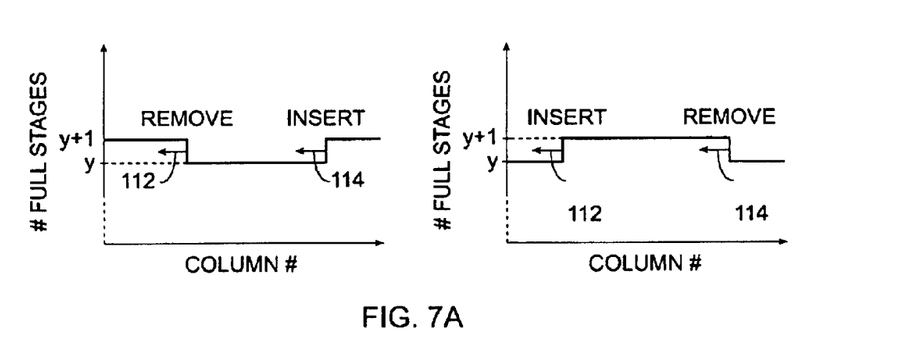
FIG. 7A depicts graphs illustrating the states of column FIFOs of a rectangular SCS FIFO incorporating an embodiment of the present invention.

If the order in which data items are removed from the columns is the same as the order in which data items are input, but with any "rotational" offset, then the difference in the number of full stages between any two columns is at most one. FIG. 7A illustrates some typical states for the column FIFOs. The graph depicted in FIG. 7A indicates the number of full stages in each column. The left-pointing arrows 112 and 114 indicate that the edge moves left as a data item is removed or inserted respectively. Consequently, just after a data item is inserted in column 106-9, that causes the output from detector 110 to become TRUE, each other column may have at most the same number of full stages as column 106-9. Because column 106-9 has at least one empty stage when the output of detector 110 becomes TRUE, each other column also has at least one empty stage when detector 110 output becomes TRUE. Thus, just after the output of northeast detector 110 becomes TRUE, there are at least ten empty stages in the column FIFOs plus the number of empty stages in top row 102. The number of empty stages in top row 102 is at least $(q*d_r)=10*1/3$, where "q" is the number of stages in top row 102. Accordingly, when the output of northeast detector 110 becomes TRUE, there are at least thirteen empty stages that can be filled by data items that may be "in flight" to square FIFO 100 before the producer must stop delivering items. The actual number of empty stages is greater than this, as will be explained shortly.

When bottom row 104 is operating in the bubble-limited region, removal of data items from the columns occurs in the opposite order in which inserts take place. This is because bubbles are inserted in the order: column 106-0, 106-1, 106-2, 106-3, 106-4, 106-5, 106-6, 106-7, 106-8, 106-9. For example, consider a case when the last two rows of the column FIFOs are full, and thus contain a total of 20 data items. The second item from column 106-9 can only move into bottom row FIFO 104 when all items in bottom row 104 have been removed from the output port of square FIFO 100. When all the items in bottom row FIFO 104 are being removed, an item from each column drops down in bottom row 104 immediately after the "tail" item of the current bottom-row items passes. Thus items are removed from the columns in the order: column 106-0, 106-1, 106-2, 106-3, 106-4, 106-5, 106-6, 106-7, 106-8, 106-9.

Figure 7B:
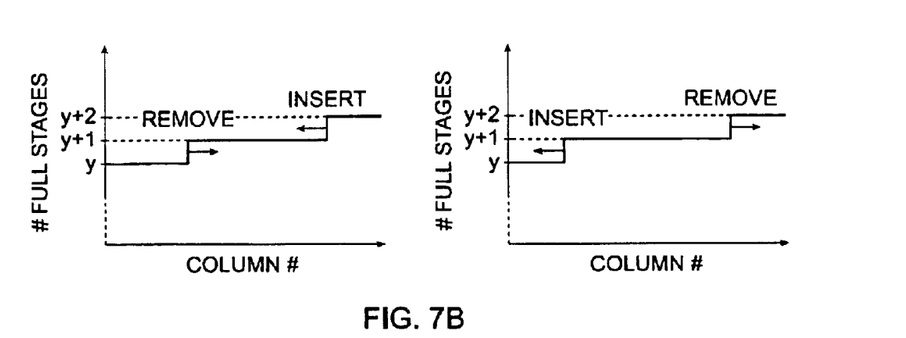
FIG. 7B depicts graphs illustrating the number of full stages versus the column number when insertions and removals are carried out in the opposite order in a square FIFO incorporating an embodiment of the present invention.

Since data items are removed from the columns in the opposite order in which they are inserted, there is more space available for data items in flight than the minimum value of thirteen derived above. There can be as many as 22 empty stages as will be explained below. FIG. 7B illustrates some typical graphs for the number of full stages versus the column number when data items are removed from the columns in the opposite order in which they were inserted. In this figure, the number of full stages in column "i" is at most the number of full stages in column "i+1" for all i, $0 \leq i \leq 10$. So just before the output of northeast detector 110 becomes TRUE, when column 106-9 has at least two empty stages, all other columns have at least two empty stages also. Accordingly, at the moment the output of detector 110 changes from FALSE to TRUE, there are at least (20−1) empty stages in the columns plus the empty stages in top row 102. This gives the number of empty stages in distributor FIFO 102. As calculated earlier, there will be a minimum of 3 empty stages in distributor FIFO 102 at this time, giving a total minimum of (20−1)+3=22 empty stages in square FIFO 100.

A similar analysis may be performed for detector 108 coupled to the southwest corner of square FIFO 100 which is used to send its "emptiness" signal to the consumer of data items from the output port of square FIFO 100. Output of detector 108 is used to indicate when the FIFO is nearing empty. When the output of southwest detector 108 becomes FALSE, the consumer must stop requesting data items from square FIFO 100, possibly after some delay. When the output of detector 108 becomes TRUE, the consumer may start removing data items from FIFO 100 again, also possibly after some delay. In a similar manner, when southwest detector 108 becomes FALSE, there are at least 19 data items in column FIFOs 106 and an additional $\lfloor (q^*d_f) \rfloor = \lfloor (10^*\frac{2}{3}) \rfloor = 6$ data items in collector FIFO 104, i.e. there will be at least (19+6)=25 data items in square FIFO 100 that can be emptied by requests that may be "in flight" to square FIFO 100.

A rectangular FIFO used in conjunction with the present invention provides several advantages. It can sustain a high throughput, have a low latency, allow for simple and independent detectors for partial full, partial empty, nearly full, and nearly empty detection, and also allow for the concurrent operation of producer and consumer. Similar analysis may be performed for detectors located at other places on the left or right column of square FIFO 100 or other rectangular FIFOs. For example, in an embodiment of the present invention, if a detector is located in the far northwest corner, at the top of column 0, at the moment that the output from the detector becomes TRUE there are at least 11 empty stages. If the empty detector is located in the far southeast corner, at the bottom of column 9, at the moment the detector becomes FALSE there are also at least 11 full stages.

A technique has been described for detecting partial fullness of a FIFO using m-out-of-n detectors. Embodiments incorporating the present invention provide several advantages over conventional techniques. For example, embodiments of the present invention can indicate the partial fullness level of a FIFO by monitoring the partial fullness levels of only a few stages of the FIFO. This presents an improvement over conventional techniques which have to measure the fullness of every stage of the FIFO. By choosing appropriate values for "m" and "n" for the m-out-of-n detector, circuitry required for generating the partial fullness indicator signals may be minimized while preserving the accuracy of the fullness estimation. The fullness signals according to the present invention indicate that the FIFO is within some range of fullness. As described above, upper and lower bounds of this range of fullness can be determined based on factors such as the FIFO topology, the characteristics of the stages of the FIFO, and the environment in which the FIFO is operated. The fullness detection technique according to the present invention is well suited for SCS FIFOs, where the input and output data rates of each of the concurrent column FIFOs are inherently a fraction of the overall input and output data rates of the FIFO as a whole, this fraction being determined by the number of such columns FIFOs, their circuit implementation, and by the characteristics of the distribution and collection circuits.

Although specific embodiments of the invention have been described, various modifications, alterations, alternative constructions, and equivalents are also encompassed within the scope of the invention. The described invention is not restricted to operation within certain specific environments, but is free to operate within a plurality of environments. Additionally, the present invention may be used in a wide variety of applications.

Further, while the present invention has been described using a particular combination of hardware, it should be recognized that other combinations of hardware are also encompassed within the scope of the present invention. The present invention may also be implemented using combinations of hardware and software.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

Table of Symbols

The following table lists the symbols which have been used to describe the present invention. The symbols listed in the table are not meant to in any way limit the scope of the present invention as recited in the claims.

| SYMBOL | DESCRIPTION |
| --- | --- |
| m | "m" stages of a m-out-of-n detector |
| n | "n" stages to which a m-out-of-n detector is connected |
| R | Number of stages in a linear FIFO (length of a linear FIFO) |
| P | Number of stages in a second linear FIFO (length of a second linear FIFO) |
| x | Number of stages between the center of a m-out-of-n detector and the output port of a FIFO to which the m-out-of-n detector is connected |
| Y | Number of data items that can still be input to a FIFO when a signal from a m-out-of-n detector coupled to the FIFO changes from FALSE to TRUE |
| Z | Number of data items that can still be removed from a FIFO when a signal from a m-out-of-n detector coupled to the FIFO changes from TRUE to FALSE |
| nFull | Number of full stages in a FIFO |
| $d_f$ | Data item density of a FIFO |
| $d_r$ | Bubble density of a FIFO |

-continued

| SYMBOL | DESCRIPTION |
|---|---|
| $L_f$ | Forward latency through a single FIFO stage |
| $L_r$ | Reverse latency through a single FIFO stage |
| $r_{in}$ | Normalized input rate |
| $r_{out}$ | Normalized output rate |
| $f_{in}$ | Maximum input rate |
| $f_{FIFO}$ | Maximum FIFO throughput |
| $f_{out}$ | Maximum number of data items per second that a consumer can remove from a FIFO |
| $I_d$ | Data item density at maximum input rate |
| $B_d$ | Bubble density at maximum output rate |
| g | Number of branches in a SCS FIFO |
| q | Number of stages in the top row of a square FIFO |
| i | Number of a colunm of a square FIFO |
| y | See FIGS. 7A and 7B |

What is claimed is:

1. An apparatus comprising:
a FIFO comprising a plurality of stages; and
a partial fullness detector coupled to a subset of the plurality of stages of the FIFO, the partial fullness detector configured to output a signal indicating a partial fullness level of the FIFO, wherein the subset of stages of the FIFO to which the partial fullness detector is coupled comprise consecutive stages of a linear segment of the FIFO, and wherein the FIFO is a linear flow-through FIFO or a serial-concurrent-serial FIFO.

2. An apparatus comprising:
a FIFO comprising a plurality of stages; and
a partial fullness detector coupled to a subset of the plurality of stages of the FIFO, the partial fullness detector configured to output a signal indicating a partial fullness level of the FIFO,
wherein the partial fullness detector is a m-out-of-n detector coupled to "n" stages of the FIFO and configured to produce a first output signal when "m" of the "n" stages coupled to the m-out-of-n detector are full and to produce a second signal when "m" of the "n" stages coupled to the m-out-of-n detector are empty, wherein m>n/2.

3. The apparatus of claim 2 wherein the m-out-of-n detector is a 3-out-of-4 detector.

4. The apparatus of claim 2 wherein the signals produced by the partial fullness detector indicate a range of the number of full stages in the FIFO.

5. The apparatus of claim 4 wherein the range of the number of full stages is calculated based upon performance parameters associated with the FIFO and maximum data rates of a producer sending data to the FIFO and a consumer removing data from the FIFO.

6. The apparatus of claim 2 wherein the FIFO operates in an environment wherein:
item density at maximum input rate $(I_d)<\frac{1}{2}$; and
bubble density at maximum output rate $(B_d)<\frac{1}{2}$.

7. The apparatus of claim 2 wherein the FIFO is a linear flow-through FIFO.

8. The apparatus of claim 2 wherein the FIFO is a serial-concurrent-serial FIFO.

9. The apparatus of 8 wherein the serial-concurrent-serial FIFO is a rectangular serial-concurrent-serial FIFO.

10. The apparatus of claim 2 wherein the subset of stages of the FIFO to which the partial fullness detector is coupled comprise consecutive stages of a linear segment of the FIFO, and wherein the FIFO is a linear flow-through FIFO or a serial-concurrent-serial FIFO.

11. A method of indicating partial fullness level of a FIFO comprising a plurality of stages, the method comprising:
coupling a partial fullness detector to a subset of the plurality of stages of the FIFO, and
outputting a signal from the partial fullness detector indicating a partial fullness level of the FIFO, wherein the subset of stages of the FIFO to which the partial fullness detector is coupled comprise consecutive stages of a linear segment of the FIFO, and wherein the FIFO is a linear flow-through FIFO or a serial-concurrent-serial FIFO.

12. A method of indicating partial fullness level of a FIFO comprising a plurality of stages, the method comprising:
coupling a partial fullness detector to a subset of the plurality of stages of the FIFO, and
outputting a signal from the partial fullness detector indicating a partial fullness level of the FIFO,
wherein coupling the partial fullness detector comprises coupling a m-out-of-n detector to "n" stages of the FIFO; and
wherein outputting the signal produced by the partial fullness detector comprises outputting a first output signal when "m" of the "n" stages coupled to the m-out-of-n detector are full and outputting a second signal when "m" of the "n" stages coupled to the m-out-of-n detector are empty, wherein m>n/2.

13. The method of claim 12 wherein the m-out-of-n detector is a 3-out-of-4 detector.

14. The method of claim 12 wherein the signals produced by the partial fullness detector indicate a range of the number of full stages in the FIFO.

15. The method of claim 14 wherein the range of the number of full stages is calculated based upon performance parameters associated with the FIFO and maximum data rates of a producer sending data to the FIFO and a consumer removing data from the FIFO.

16. The method of claim 12 wherein the FIFO operates in an environment wherein:
item density at maximum input rate $(I_d)<\frac{1}{2}$; and
bubble density at maximum output rate $(B_d)<\frac{1}{2}$.

17. The method of claim 12 wherein the FIFO is a linear flow-through FIFO.

18. The method of claim 12 wherein the FIFO is a serial-concurrent-serial FIFO.

19. The method of claim 18 wherein the serial-concurrent-serial FIFO is a rectangular serial-concurrent-serial FIFO.

20. The method of claim 12 wherein the subset of stages of the FIFO to which the partial fullness detector is coupled comprise consecutive stages of a linear segment of the FIFO, and wherein the FIFO is a linear flow-through FIFO or a serial-concurrent-serial FIFO.

21. An apparatus comprising:
a FIFO comprising a plurality of stages; and
a m-out-of-n detector coupled to "n" stages of the FIFO and configured to output a signal indicating a partial fullness level of the FIFO, the m-out-of-n detector configured to output the signal in a first state when "m" stages coupled to the m-out-of-n detector are full, and to output the signal in a second state when "m" stages coupled to the m-out-of-n detector are empty.

22. The apparatus of claim 21 wherein the m-out-of-n detector is a 3-out-of-4 detector.

23. The apparatus of claim 21 wherein the m-out-of-n detector has values of "m" and "n" such that "m" is greater than "n/2".

24. The apparatus of claim 21 wherein the partial fullness level has a value between 0 and 1 inclusive, wherein a value of 0 indicates that the FIFO is empty and a value of 1 indicates that the FIFO is completely full.

25. The apparatus of claim 21 wherein the partial fullness level is selected from a group comprising of a ½ full level, a ¼ full level, a ¾ full level, a ⅓ full level, and a ⅔ full level.

26. The apparatus of claim 21 wherein a number of full stages of the FIFO lies in a first range when the m-out-of-n detector outputs the signal in the first state, and in a second range when the m-out-of-n detector outputs the signal in the second state.

27. The apparatus of claim 26 wherein the first range is expressed by inequality $$x(1 - B_d) \leq nFull \leq P \text{ when } I_d < \frac{(n-m+1)}{n}$$

where $I_d$ is a data item density of the FIFO at maximum input rate, "x" is a stage boundary of the FIFO at which the m-out-of-n detector is placed, "$B_d$" is a bubble density at maximum output rate of the FIFO, "nFull" is the number of full stages in the FIFO, and "P" is a total number of stages in the FIFO.

28. The apparatus of claim 26 wherein the second range is expressed by inequality $$0 \leq nFull \leq (x + I_d * (P - x)) \text{ when } B_d < \frac{(n-m+1)}{n}$$

where $B_d$ is a bubble density of the FIFO at maximum output rate, "x" is a stage boundary of the FIFO at which the m-out-of-n detector is placed, "$I_d$" is a data item density of the FIFO at maximum input rate, "nFull" is the number of full stages in the FIFO, and "P" is a total number of stages in the FIFO.

29. An apparatus comprising:

a serial-concurrent-serial (SCS) FIFO comprising a plurality of branches, each branch comprising a plurality of stages; and a m-out-of-n detector coupled to "n" stages of the SCS FIFO and configured to output a signal indicating a partial fullness level of the SCS FIFO, the m-out-of-n detector configured to output the signal in a first state when "m" stages coupled to the m-out-of-n detector are full, and to output the signal in a second state when "m" stages coupled to the m-out-of-n detector are empty.

30. The apparatus of claim 29 wherein the "n" stages belong to a branch of the SCS FIFO.

31. The apparatus of claim 29 wherein each of the "n" stages belong to at least two branches of the SCS FIFO.

32. An apparatus comprising:

a rectangular serial-concurrent-serial (SCS) FIFO comprising a distributor, a collector, and column FIFOs comprising a plurality of stages, the distributor configured to distribute data items to the column FIFOs and the collector configured to collect the data items from the column FIFOs;

a first m-out-of-n detector coupled to "n" stages of a first column FIFO from the column FIFOs, the first m-out-of-n detector configured to output a first signal indicating a fullness level of the first column FIFO, the first m-out-of-n detector configured to output the first signal in a first state when "m" stages coupled to the first m-out-of-n detector are full, and to output the first signal in a second state when "m" stages coupled to the first m-out-of-n detector are empty; and a second m-out-of-n detector coupled to "n" stages of a second column FIFO from the column FIFOs, the second m-out-of-n detector configured to output a second signal indicating a fullness level of the second column FIFO, the second m-out-of-n detector configured to output the second signal in a first state when "m" stages coupled to the second m-out-of-n detector are full, and to output the second signal in a second state when "m" stages coupled to the second m-out-of-n detector are empty.

33. The apparatus of claim 32 wherein:

the first signal output by the first m-out-of-n detector indicates when the distributor should stop distributing data items to the column FIFOs; and the second signal output by the second m-out-of-n detector indicates when the collector should stop collecting data items from the column FIFOs.

34. A method of indicating partial fullness level of a FIFO comprising a plurality of stages, the method comprising:

coupling a m out of n detector to "n" stages of the FIFO, the m out of n detector configured to output a signal indicating a partial fullness level of the FIFO;

outputting the signal in a first state when "m" stages coupled to the m out of n detector are full; and outputting the signal in a second state when "m" stages coupled to the m out of n detector are empty.

35. The method of claim 34 wherein the m-out-of-n detector is a 3-out-of-4 detector.

36. The method of claim 34 wherein the m-out-of-n detector has values of "m" and "n" such that "m" is greater than "n/2".

37. The method of claim 34 wherein the partial fullness level has a value between 0 and 1 inclusive, wherein a value of 0 indicates that the FIFO is empty and a value of 1 indicates that the FIFO is completely full.

38. The method of claim 34 wherein the partial fullness level is selected from a group comprising of a ½ full level, a ¼ full level, a ¾ full level, a ⅓ full level, and a ⅔ full level.

39. The method of claim 34 wherein:

outputting the signal in the first state indicates that a number of full stages of the FIFO lies in a first range; and outputting the signal in the second state indicates that the number of full stages of the FIFO lies in a second range.

40. The method of claim 39 wherein the first range is expressed by inequality $$(x - B_d * x) \leq nFull \leq P \text{ when } I_d < \frac{(n-m+1)}{n}$$

where $I_d$ is a data item density of the FIFO at maximum input rate, "x" is a stage boundary of the FIFO at which the m-out-of-n detector is placed, "$B_d$" is a bubble density at maximum output rate of the FIFO, "nFull" is the number of full stages in the FIFO, and "P" is the total number of stages in the FIFO.

41. The method of claim 39 wherein the second range is expressed by inequality $$0 \leq nFull \leq (x + I_d * (P - x)) \text{ when } B_d < \frac{(n-m+1)}{n}$$

where $B_d$ is a bubble density of the FIFO at maximum output rate, "x" is a stage boundary of the FIFO at which the m-out-of-n detector is placed, "$I_d$" is a data item rate at maximum input rate of the FIFO, "nFull" is the number of full stages in the FIFO, and "P" is the total number of stages in the FIFO.

42. A method of indicating partial fullness level of a serial-concurrent-serial (SCS) FIFO comprising a plurality of branches, each branch comprising a plurality of stages, the method comprising:

coupling a m-out-of-n detector to "n" stages of the SCS FIFO, the m-out-of-n detector configured to output a signal indicating a partial fullness level of the SCS FIFO;

outputting the signal in a first state when "m" stages of the SCS FIFO coupled to the m-out-of-n detector are full; and outputting the signal in a second state when "m" stages of the SCS FIFO coupled to the m-out-of-n detector are empty.

43. The method of claim 42 wherein the "n" stages to which the m-out-of-n detector is coupled belong to a single branch of the SCS FIFO.

44. The method of claim 42 wherein the "n" stages to which the m-out-of-n detector is coupled belong to at least two branches of the SCS FIFO.

45. A method of indicating partial fullness level of a rectangular serial-concurrent-serial (SCS) FIFO comprising a distributor, a collector, and column FIFOs comprising a plurality of stages, the distributor configured to distribute data items to the column FIFOs and the collector configured to collect the data items from the column FIFOs comprising a plurality of branches, each branch comprising a plurality of stages, the method comprising:

coupling a first m-out-of-n detector coupled to "n" stages of a first column FIFO from the plurality of column FIFOs, the first m-out-of-n detector configured to output a first signal indicating a fullness level of the first column FIFO;

coupling a second m-out-of-n detector coupled to "n" stages of a second column FIFO from the plurality of column FIFOs, the second m-out-of-n detector configured to output a second signal indicating a fullness level of the second column FIFO;

outputting a first signal from the first m-out-of-n detector to indicate when the distributor should stop distributing data items to the column FIFOs; and outputting a second signal from the second m-out-of-n detector to indicate when the collector should stop collecting data items from the column FIFOs.

46. The method of claim 45 wherein:

outputting the first signal comprises outputting the first signal in a first state when "m" stages coupled to the first m-out-of-n detector are full and outputting the first signal in a second state when "m" stages coupled to the first m-out-of-n detector are empty; and outputting the second signal comprises outputting the second signal in a first state when "m" stages coupled to the second m-out-of-n detector are full and outputting the second signal in a second state when "m" stages coupled to the second m-out-of-n detector are empty.

* * * * *